US006039165A

United States Patent [19]

Wild

[11] Patent Number: 6,039,165
[45] Date of Patent: Mar. 21, 2000

[54] METHODS FOR COIN SORTING, COIN CHANGE MECHANISM, AND PUBLIC TELEPHONE OPERABLE THEREWITH

[75] Inventor: Ronald Lee Wild, Carmel, Ind.

[73] Assignee: Lucent Technologies Inc., Murray Hill, N.J.

[21] Appl. No.: 09/024,724

[22] Filed: Feb. 17, 1998

[51] Int. Cl.[7] .............................. G06F 7/00; G07D 5/08; G07D 3/02; G07F 1/04; H04M 17/02

[52] U.S. Cl. .......................... 194/217; 194/319; 194/346; 379/150; 453/14; 453/21

[58] Field of Search .................................... 194/346, 317, 194/318, 319, 217, 218; 453/9, 11, 14, 15, 3, 4, 21, 41; 379/149, 150, 155

[56] References Cited

U.S. PATENT DOCUMENTS

| | | | |
|---|---|---|---|
| 4,089,400 | 5/1978 | Gregory, Jr. | 194/346 |
| 4,192,972 | 3/1980 | Bertoglio et al. | 194/216 |
| 4,792,057 | 12/1988 | Mizer et al. | 453/44 |
| 4,971,188 | 11/1990 | Deters | 453/15 |
| 5,217,100 | 6/1993 | Thompson et al. | 194/346 |
| 5,492,212 | 2/1996 | Fillod et al. | 453/3 |
| 5,579,886 | 12/1996 | Ishida et al. | 194/346 |

FOREIGN PATENT DOCUMENTS

| | | | |
|---|---|---|---|
| 143609 | 5/1920 | United Kingdom | 453/9 |

*Primary Examiner*—Robert P. Olszewski
*Assistant Examiner*—Bryan Jaketic

[57] ABSTRACT

A public telephone that has the ability to return change to a user is described. A coin changer that is advantageously sized to fit within the space available in a public telephone built to BellCore standards advantageously replaces the coin collect/reject equipment located after a "coin-discrimination" portion of conventional coin mechanisms found in such telephones. Existing public telephones may be readily retrofitted with the present coin changer. A three-position "trigate" is advantageously used to direct a coin to a return chute, or to one of two mechanical coin sorters within the coin changer. In one embodiment, each sorter is operable to sort three different coin denominations. Escrow capacity is included to temporarily store sorted coins. The sorters/escrow are advantageously readily-removable so that a first sorter may be removed and another inserted to provide sorting and escrow for other coins from other coin sets, including those from other countries. Coins are delivered from escrow, under control of a processor, to a collect/return manifold containing steering vanes and coin-receiving channels. The processor is operable to determine (i) whether or not change is due, and (ii) if change is due, what coins should comprise such change. Up to three coins, each of a different denomination, are delivered to the manifold at a time. The processor controls coin routing through the manifold to a return port or a coin-collection reservoir via the steering vanes.

37 Claims, 7 Drawing Sheets

METHODS FOR COIN SORTING, COIN CHANGE MECHANISM, AND PUBLIC TELEPHONE OPERABLE THEREWITH

FIELD OF THE INVENTION

The present invention relates to improvements in public telephones. More particularly, the present invention relates to various aspects of a coin-change mechanism and methods for coin sorting suitable for use in public telephones.

BACKGROUND OF THE INVENTION

Public wire-line telephones, though of diminished importance in view of the ubiquitous cellular phone, are still commonplace. For a fee, any member of the public can use such a telephone. That fee is often paid by inserting coins into the phone's coin slot, or by swiping a credit card through a local card reader, or by providing a credit card number to an operator. If coins are used to pay for the call, they provide a user with a predetermined amount of initial connect time (e.g., five minutes). Near the end of the initial connect period, the user is typically advised by a computer-generated message that the call is extendable for a specified period of time for a specified amount of money (e.g., "please deposit 60 cents for the next three minutes"). If the user wishes to extend the call, the appropriate coins are inserted into the coin slot.

A telephone call may end before the allotted time period expires. In such a case, a credit may be owed to the user. Unfortunately for the user, most public telephones do not provide change. In some cases, the user may contact a telephone operator to request that the credit be applied to a personal telephone, but most do not bother to do so.

In view of the foregoing, the public would benefit from a public telephone that provides change.

SUMMARY OF THE INVENTION

Embodiments of the present invention provide a public telephone that has the ability to return change to a user. A device for providing change ("coin changer") that is preferably sized to fit within the space available in a public telephone built to BellCore standards advantageously replaces the coin collect/reject equipment located after a "coin-discrimination" portion of conventional coin mechanisms found in such telephones. It will be recognized that the coin changer may be built to fit the dimensions of public telephones. As such, existing public telephones may be readily retrofitted in accordance with an illustrative embodiment of the present invention.

In some embodiments, a public telephone incorporating the present coin changer is operable to (i) sort up to six coin denominations, (ii) store coins of various denominations separately, and (iii) control an amount of coins returned to a user. Conventional coin mechanisms use a two-position "reject gate" to direct a coin to a return chute, or, alternatively, to an escrow hopper. In accordance with an illustrative embodiment of the present invention, a three-position "trigate" is advantageously used to direct a coin to a return chute, or to one of two mechanical coin sorters. In one embodiment, each coin sorter is operable to sort, by diameter, three denominations of coins. Using two sorters accommodates a situation wherein, for example, a country has two different coin denominations with substantially the same diameter (e.g., a Susan B. Anthony dollar and a quarter). In embodiments in which the sorters sort three denominations of coins, the coin changer advantageously includes hoppers that provide escrow capacity for the different coin denominations. The sorters and hoppers are advantageously readily-removable and insertable. Thus, a public telephone in accordance with the illustrative embodiments is readily configurable, as required, to sort coins from a variety of different coin sets.

Coins are dropped from coin escrow on to a coin ledge located directly above steering vanes and coin-receiving channels. Up to three coins, each of a different denomination, are dropped on to the coin ledge at the same time. A processor that receives data from coin sensors in the sensor chute determines (i) whether or not change is due, and (ii) if change is due, what coins should comprise such change. On a signal from the processor, a shuttle moves in a direction appropriate for dropping ("shuttling") the coins off the coin ledge. Meanwhile, the steering vanes, also under the processor's control, are independently moved, as appropriate, to direct a shuttled coin towards a coin-collect channel that routes a coin to a coin-collection reservoir, or towards a coin-return channel that routes a coin to a return port.

A coin changer in accordance with the present teachings advantageously requires very few active devices. In some embodiments, the present coin changer is operable to sort up to six coin denominations using only five active devices, including a trigate actuator, one motor for the shuttle, and three solenoids for the steering vanes. Though used in different applications (e.g., vending machines, etc.), most conventional coin changers require about two active devices per coin denomination as compared with about one for the present coin changer.

DETAILED DESCRIPTION

Figure 1:
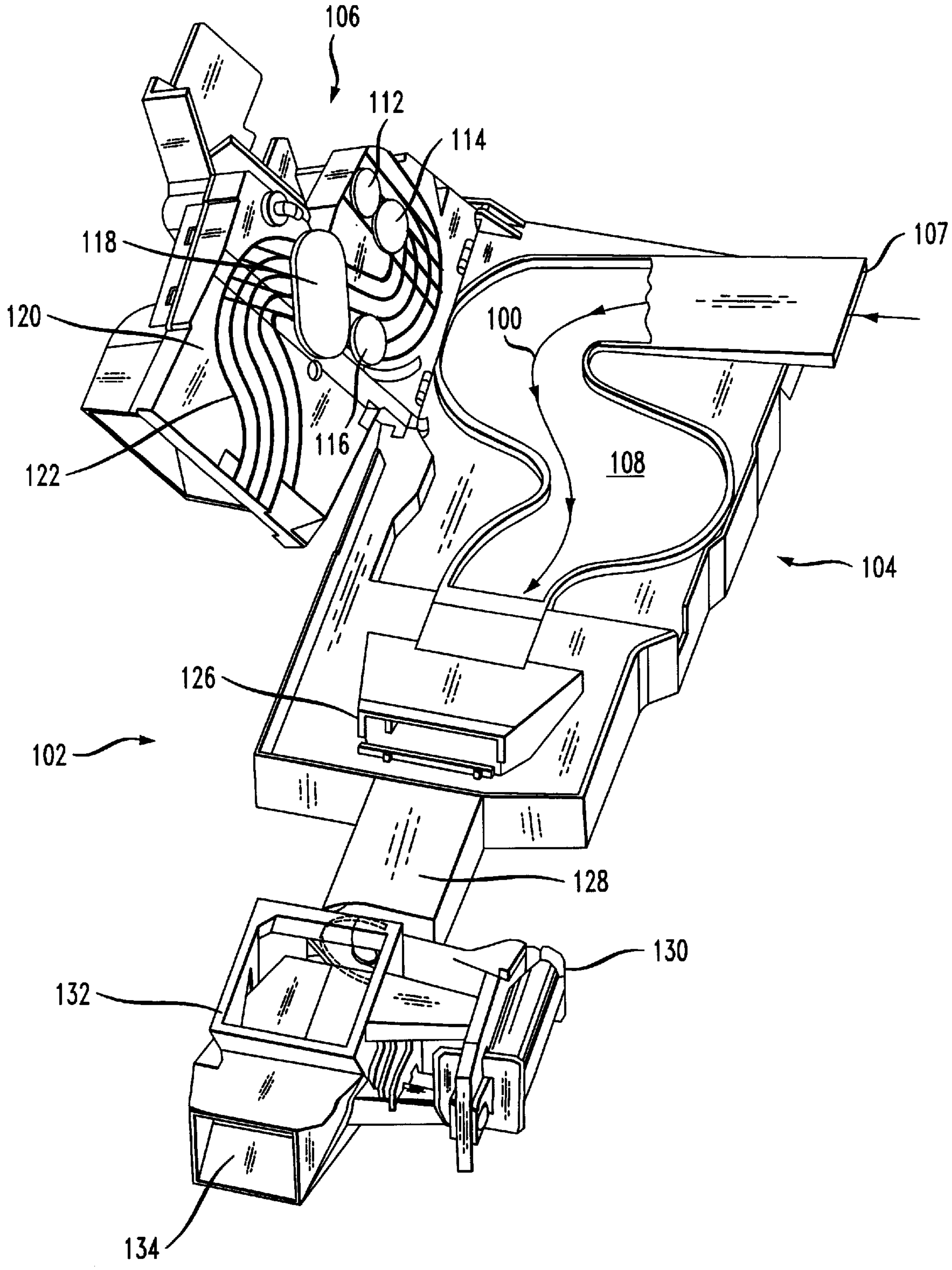
FIG. 1 PRIOR ART
FIG. 1 depicts a conventional coin mechanism including a coin discriminator, reject gate, and collect port.

FIG. 1 depicts a conventional coin mechanism 102 having coin discriminator 104, reject gate 126, escrow hopper 128, relay 130, escrow-return port 132 and escrow-collect port 134. A return chute (not shown) for rejecting slugs, foreign coins, or for returning coins when, for example, a connection is not established, is also part of conventional coin mechanism 102. Coin discriminator 104 typically includes hinged portion 106. Hinged portion 106 is rotatable away from sensor chute 108 to allow coin jams to be cleared. In FIG. 1, hinged portion 106 is shown rotated away from sensor chute 108 for clarity of illustration.

Coin sensors 112–118 are disposed near inside surface 120 of hinged portion 106. For use, hinged portion 106 is rotated into an operating position, wherein ribs 122 and sensors 112–118 are opposed to sensor chute 108. In the operating position, ribs 122 and sensor chute 108 define an enclosed passageway for channeling a coin through coin discriminator 104.

A coin deposited at coin insert 107 is gravity impelled along sensor chute 108 and passes through electromagnetic fields generated by coin sensors 112–118. Additional coin sensors (not shown) are located "behind" sensor chute 108. The purpose for the two groups of sensors is to ensure that regardless of a coin's position in the chute (e.g., at the right edge, the middle, or the left edge of the chute), it passes near enough to a sensor for accurate sensing. An illustrative and typically serpentine path followed by a coin in traversing sensor chute 108 is illustrated by line "100."

As the coin passes through the sensor-generated electromagnetic fields, a signal is generated by at least one of the sensors. Such a signal, or, more particularly, a characteristic of the signal (e.g., distortion, etc.) is indicative of a property of the coin (e.g., metal type, metal content, etc.). The signal generated by such a sensor is routed to a processor (not shown). The processor compares the signal to benchmark data useful for determining the authenticity and denomination of a coin from a particular coin set (e.g., United States currency). Such data may be stored, for example, in a computer-storage medium accessible to the processor. A determination is made as to the authenticity and denomination of the coin. The aforedescribed process, known as "discrimination," as well as the sensors used therefor, are well known in the art.

Having discriminated a coin, the processor sends a signal to an actuator (not shown) that controls the operation of reject gate 126. If the coin is unacceptable, the reject gate 126 remains in a "reject" position wherein the coin is delivered to a return chute (not shown). In the illustrative embodiment depicted in FIG. 1, reject gate 126 is in the reject position. If the coin is acceptable, the reject gate 126 is switched to a "deliver to escrow" position, and the coin is delivered to escrow hopper 128.

If a desired telephone connection is established, relay 130 is signaled to release any coins retained in escrow hopper 128. The coins are directed through collect port 134 and routed to a coin-collection reservoir (not shown). If the telephone connection is not established (e.g., a busy line, etc.), relay 130 is directed to block access to collect port 134 and to release coins from escrow hopper 128. The released coins are routed through return port 132 to a return chute (not shown), where they can be retrieved by the customer.

Conventional coin mechanism 102 thus discriminates a coin and routes it to return (if it is unacceptable or if a connection cannot be established) or, alternatively, to a collect reservoir. Such a conventional coin mechanism, however, is not able to provide change if a credit is due to a user. While some public telephones are adapted to provide change, such phones tend to be substantially larger than the BellCore standard public telephones. The coin change mechanisms used in such phones consequently cannot be adapted to fit within a public telephone designed to BellCore standards.

The present invention provides a public telephone capable of providing change. In accordance with an illustrative embodiment of the present invention, a mechanism for providing change ("coin changer") is suitably-configured to fit within the space available within a Bellcore standard public telephone. In some embodiments, the present coin changer is configured to integrate with a conventional coin discriminator, such as discriminator 104 described above. Such integration is accomplished without modification of the discriminator. Moreover, the present coin changer is advantageously configured to deliver coins designated for return to existing return port 132 and to deliver coins designated for collection to collect port 134.

Figure 2:
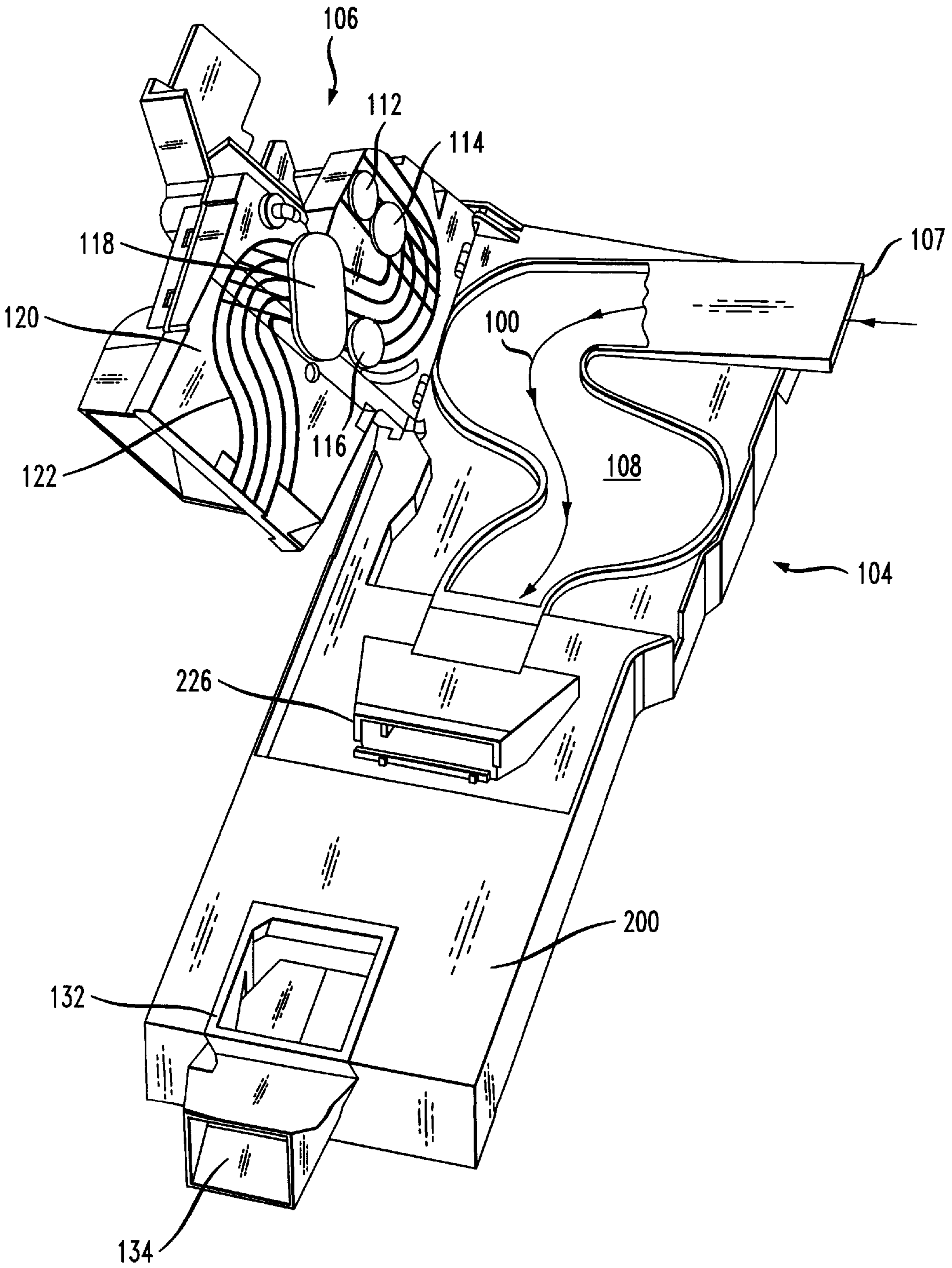
FIG. 2 depicts a coin mechanism in accordance with an illustrative embodiment of the present invention, wherein the present coin changer, shown figuratively, is integrated with a standard coin discriminator.

FIG. 2 depicts, figuratively, a coin mechanism in accordance with an illustrative embodiment of the present invention comprising coin changer 200 integrated with a conventional discriminator 104. In accordance with the invention, reject gate 126 of the prior art is replaced by trigate 226. The operation of trigate 226 is described with reference to FIG. 3*a,* which depicts a front view of illustrative coin changer 300.

Figure 3A:
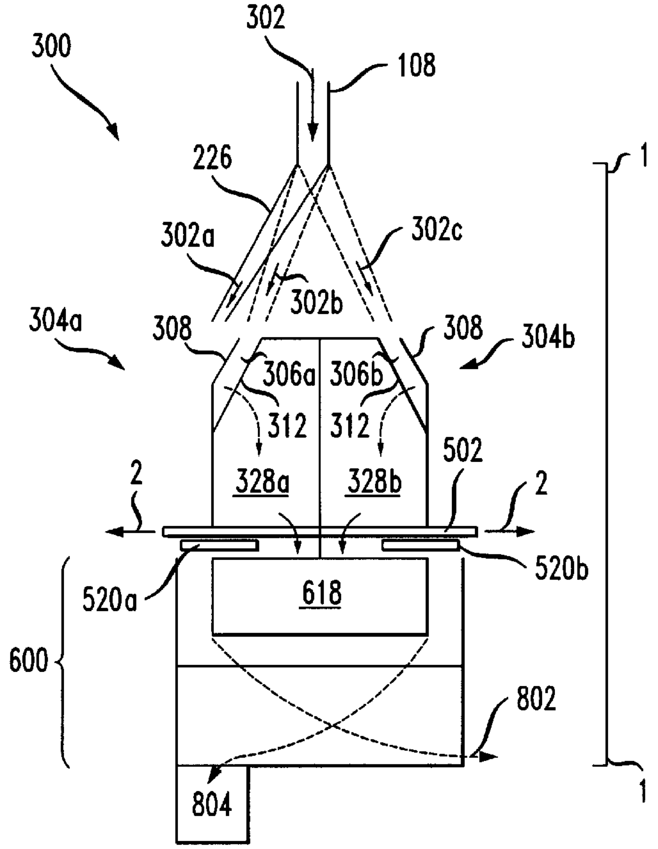
FIG. 3*a* depicts a front view of a coin changer in accordance with an illustrative embodiment of the present invention, the front view illustrating a trigate for directing a discriminated coin to a "return" path, or, alternatively, to one of two coin sorters, and further figuratively illustrating several alternate paths that a coin may follow through the coin changer.

As illustrated in FIG. 3*a,* trigate 226 is positionable to any one of three positions. In a first position, a coin (depicted by arrow 302) leaving sensor chute 108 is directed by trigate 226 along path 302*a* to the return chute previously mentioned (not shown). In a second position, trigate 226 directs a coin along path 302*b* to coin sorter 304*a.* That coin is received by channel 306*a*. In a third position, trigate 226 directs a coin along path 302*c* to coin sorter 304*b,* where it is received by channel 306*b*.

Figure 3B:
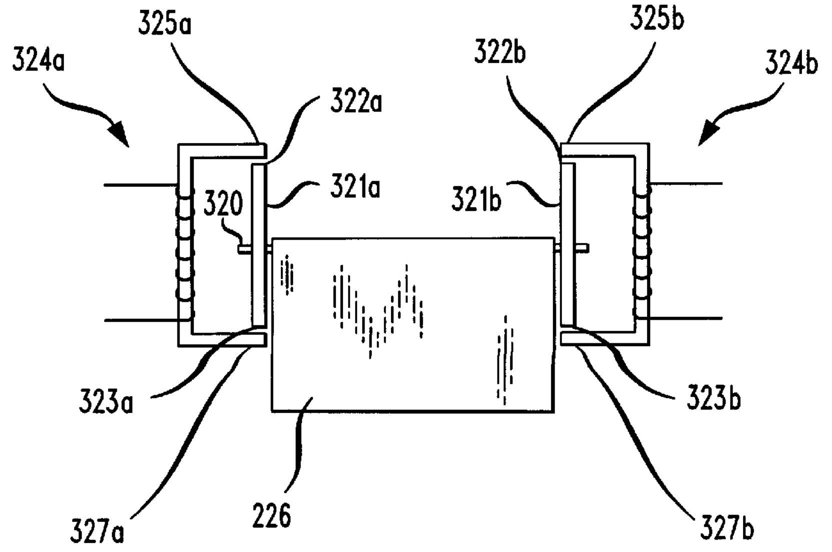
FIG. 3*b* depicts a side view of the trigate and a trigate actuation mechanism.

FIG. 3*b* depicts, in further detail, an illustrative embodiment of trigate 226 and an associated drive or actuation mechanism (trigate actuator), as viewed along line 1—1 of FIG. 3*a*. Two permanent magnets 321*a* and 321*b* are disposed on rod 320 passing through trigate 226. Rod 320 is freely rotatable about its long axis (support means for rod 320 not shown). Magnets 321*a,* 321*b* and trigate 226 rotate with rod 320. Electromagnets 324*a* and 324*b* are disposed sufficiently close to respective permanent magnets 321*a* and 321*b* such that, when the electromagnets are energized, interaction of their magnetic fields cause poles 322*a*/323*a* and 322*b*/323*b* of the permanent magnets to be repelled or attracted to poles 325*a*/327*a* and 325*b*/327*b* of the electromagnets. In the illustrative configuration depicted in FIG. 3*b,* such attractive or repellant force imparts rotational motion to permanent magnets 321*a,* 321*b,* rod 320 and trigate 226. Such force is used to position trigate 226, as described below.

After determining an initial disposition of a coin (i.e., to reject, to sorter 304*a* or to sorter 304*b*), the processor sends a signal to relays that deliver appropriate signals (i.e., stepped-up voltage) for energizing the electromagnets. Energizing one of the electromagnets, for example, electromagnet 324*a,* moves trigate 226 to the second position. Trigate 226 is moved to the third position by pulsing (i.e., briefly energizing) electromagnet 324*a,* then energizing electromagnet 324*b*. In the absence of an energizing signal, trigate 226 is advantageously spring biased to the first (reject) position. It will be appreciated that in other embodiments, trigate 226 may be actuated somewhat differently while still using the same components. In additional embodiments, other trigate actuators, such as a solenoid, a stepper motor or the like, may suitably be used. Moreover, it should be understood that another "three-way" mechanism(s) may suitably be used as a substitute for the trigate.

Figure 4:
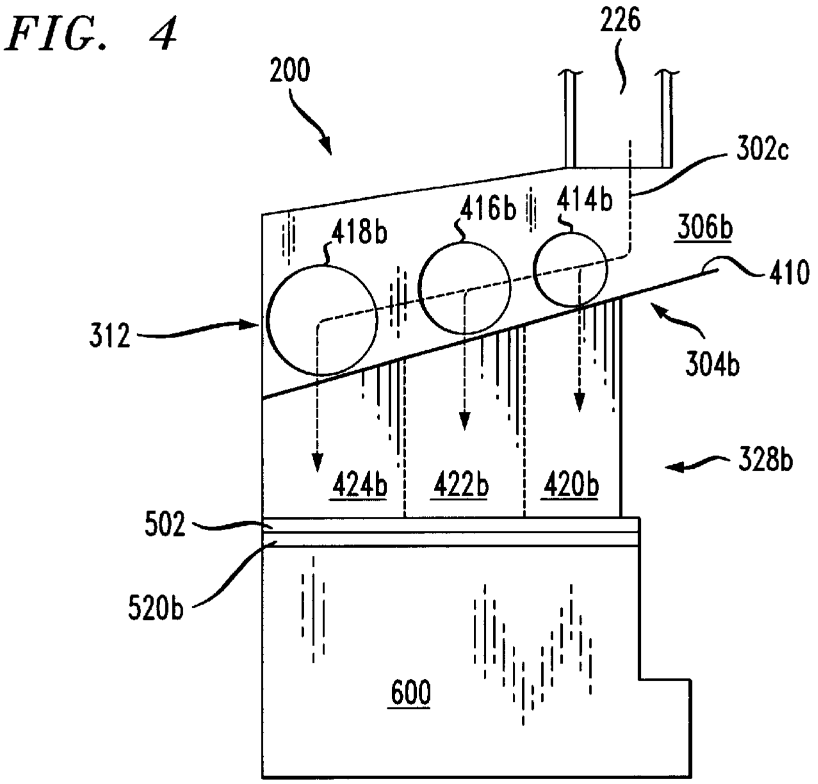
FIG. 4 depicts a side view of the illustrative coin changer of FIG. 3*a,* showing the trigate in position to deliver coins to one of the sorters, and illustrating paths followed by various denominations of coins through the sorter and into coin escrow.

FIG. 4 depicts a side view of changer 300 along line 1—1 (FIG. 3*a*) showing mechanical coin sorter 304*b* and escrow hopper 328*b*. FIG. 4 shows trigate 226 in position to deliver a coin to channel 306*b*. For clarity, outer wall 308 of channel 306*b* is not shown in FIG. 4. Coin sorter 304*b* advantageously has three diameter-sorting holes 414*b*–418*b* disposed in wall 312. Each diameter-sorting hole is sized to admit a specific denomination of coin different from the denomination admitted by other holes (e.g., a dime, a nickel and a quarter).

A coin delivered to coin sorter 304*b* continues along path 302*c* rolling/sliding down surface 410 past illustrative diameter-sorting holes 414*b*–418*b*. The holes are advantageously arranged by increasing diameter so that the coin first encounters hole 414*b* having the smallest diameter (e.g., suitable for receiving a dime), followed by hole 416*b* having the next largest diameter (e.g., suitable for receiving a nickel) and finally encountering hole 418*b* having the largest diameter (e.g. suitable for receiving a quarter). Since the processor has positioned trigate 226 as a function of the identity of each discriminated coin (e.g. if the coin is a Susan B. Anthony dollar then go to coin sorter 304*a,* if the coin is a quarter, then go to coin sorter 304*b*), a coin delivered to one of the coin sorters will necessarily be a coin that the sorter is designed to sort. Thus, the coin falls through the appropriate one of the diameter-sorting holes 414*b*–418*b* into escrow hopper 328*b*. In some embodiments, three coin-escrow tubes or other suitable receivers 420*b*–424*b* comprise escrow hopper 328*b* for receiving coins falling through respective diameter-sorting holes 414*b*–418*b*. The present escrow hoppers function analogously to escrow hopper 128 of conventional coin mechanism 102 in that both such hoppers retain coins until the disposition of such coins (e.g., return or collect) is determined. Sorter 304*a* is similarly configured and advantageously includes three diameter-sorting holes and three coin-escrow tubes.

The two coin sorters advantageously provide the present coin changer with the ability to sort six different coins. Moreover, with the exception of the size of the diameter-sorting holes and the coin escrow tubes, the coin sorters are advantageously uniformly sized. Thus, one or both coin sorters 304*a,* 304*b* may be readily removed and replaced by coin sorters having different-sized diameter-sorter holes and coin escrow tubes consistent therewith for use, for example, in a different country, in a public telephone manufactured to BellCore standards. In this connection, it is expected that a proposed uniform European currency will soon be introduced for use throughout Europe. It is expected that most countries will accept both their native currency and the European currency. As such, a "two-sorter" public phone in accordance with an illustrative embodiment of the present invention can, for example, sort coins belonging to a coin set of a first European country in one of the coin sorters and sort the unified European currency in a second coin sorter. Such a public phone could readily be adapted for use in a second European country by simply replacing the first coin sorter with a third coin sorter operable to sort coins belonging to the second country's coin set.

Figure 5:
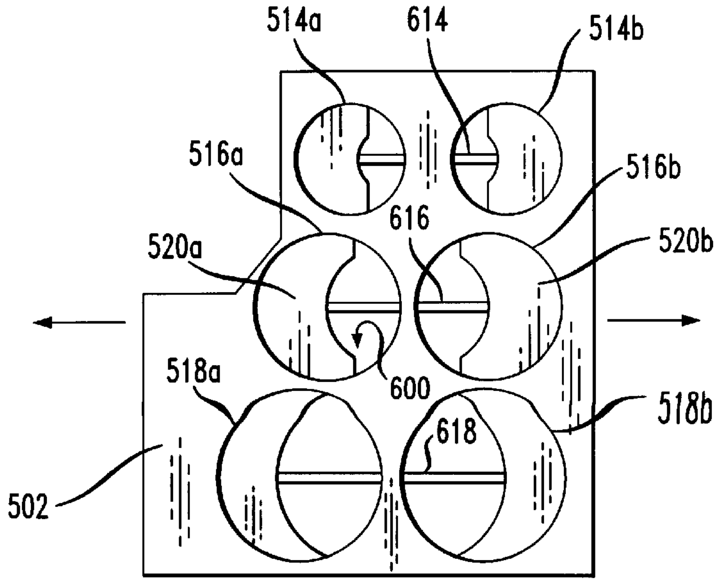
FIG. 5 depicts a top view of a shuttle, ledge and steering vanes that are located in a collect/return manifold underneath the coin escrow.

With reference to FIGS. 3*a* and 5, shuttle 502 is located beneath escrow hoppers 328*a,* 328*b,* and ledges 520*a* and 520*b* are located beneath the shuttle. As shown in FIG. 3*a,* shuttle 502 is movable along plane 2—2 (i.e., to the left and right). As depicted in FIG. 5, shuttle 502 has six coin-receiving holes 514*a*–518*a* and 514*b*–518*b*. In a "home" or "neutral" position, shuttle 502 is positioned such that the coin-escrow tubes 420*a*–424*a* are superposed over coin-receiving holes 514*a*–518*a* and coin-escrow tubes 420*b*–424*b* are superposed over coin-receiving holes 514*b*–518*b*. The tube and hole of each superposed tube-hole pair have like diameters, such that a coin dropping from a given coin-escrow tube will be received by the underlying coin-receiving hole. Coins received by coin-receiving holes 514*a*–518*a* and 514*b*–518*b* drop through such holes on to respective ledges 520*a,* 520*b*.

Subsequent coin-changer operations result in coins being directed to a coin return or a coin-collection reservoir. The disposition of each coin is controlled by the processor. If a connection cannot be established (e.g., busy signal, etc.), the processor takes appropriate actions for directing the escrowed coins to the coin return. If a call terminates before the allotted connect time expires, the processor determines the amount of money owed to the caller and directs coins to the coin return, as appropriate, to satisfy the credit. If a caller talks for the allotted connect time, the processor takes appropriate actions for directing the escrowed coins to the coin-collection reservoir. Those skilled in the art are capable of programming the processor for such tasks based upon the detailed teachings herein and to vary the programming to suit particular applications. An illustrative mechanism for accomplishing such coin routing is described below, principally with reference to FIGS. 6–8.

Figure 6:
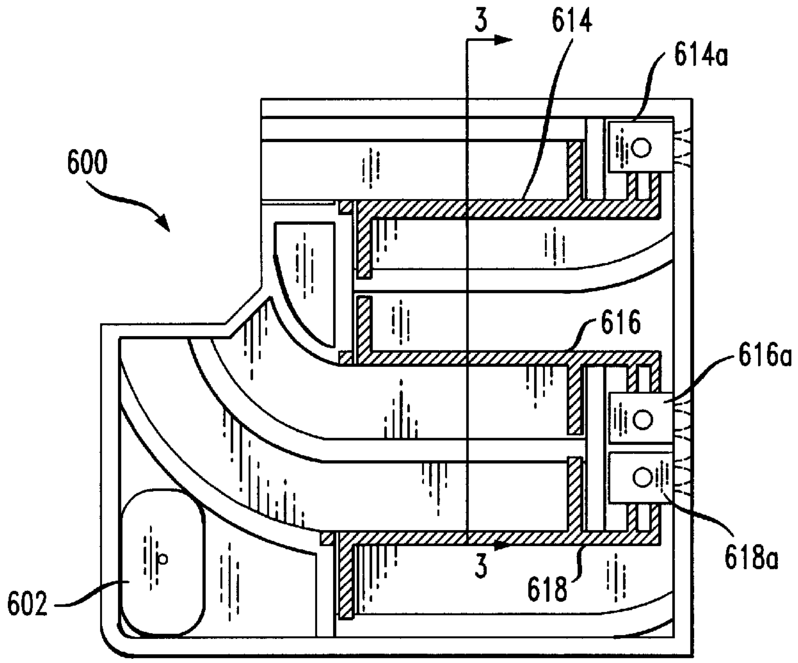
FIG. 6 depicts a top cross-sectional view of the steering vanes and coin-collect and coin-return channels.

The processor sends a signal to shuttle motor 602 (FIG. 6) to move shuttle 502 to the left or right, as appropriate, causing the coins perched on the particular ledge 520*a* or 520*b* to drop ("shuttle") into collect/return manifold 600. FIG. 6 shows a top cross-sectional view of collect/return manifold 600. The cross-sectional "slice" depicted in FIG. 6 is taken near the rotational axis (i.e., near the bottom) of coin-steering vanes 614, 616 and 618. Solenoids 614*a,* 616*a* and 618*a* which, in the illustrated embodiment, are disposed near the top of the steering vanes (see FIG. 7) are shown in FIG. 6 for pedagogical purposes, even though they are disposed above the "slice" and should therefore not appear in FIG. 6.

Figure 7:
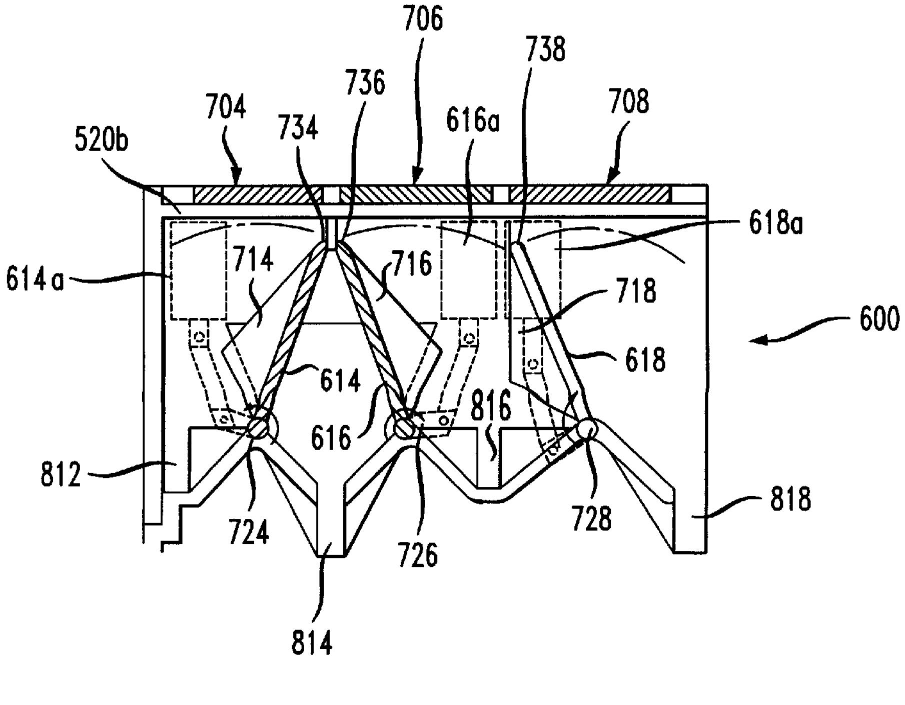
FIG. 7 depicts a cross-sectional view of FIG. 6 along line 3—3 providing additional illustration of the steering vanes and coin-collect and coin-return channels.

As shuttle motor 602 moves shuttle 502, the processor sends signals, as appropriate, that independently energize solenoids 614*a,* 616*a* and 618*a*. The solenoids 614*a*–618*a* are mechanically linked to respective coin-steering vanes 614, 616 and 618, and thus control the movement of the vanes. Operation of the coin-steering vanes is described now with reference to FIG. 7. FIG. 7 depicts a side cross-sectional view through collect/return manifold 600 along line 3—3 (FIG. 6). Steering vanes 614-618 are independently rotatable about respective rotational axes 724–728. When solenoids 614*a*–618*a* are not energized, upper portions 734–738 of respective steering vanes 614–618 are disposed in a predetermined ("home" or "unenergized") position towards the right or left perimeters (from the perspective of FIG. 7) of respective overlying coins 704–708. When a solenoid is energized upon receiving a signal from the processor, the solenoid causes the mechanically-linked steering vane to rotate about its rotational axis, causing the upper portion of that steering vane to move to a position that is diametrically opposed (relative to the coin) to its home position ("the energized position"). The position of upper portions 734–738 of respective steering vanes 614–618 controls the routing of shuttled coins towards one of two channels located on either side of each steering vane. For example, steering vane 618, shown in its home position with upper portion 738 positioned towards the left "edge" (in FIG. 7) of overlying coin 708, directs that coin, when it is shuttled, towards channel 818. When solenoid 618*a* receives an energizing signal, the solenoid rotates steering vane 618 about its rotational axis 728 such that upper portion 738 of the steering vane is positioned towards the right "edge" (in FIG. 7) of overlying coin 708. As coin 708 is shuttled into collect/return manifold 600, steering vane 618 directs the coin towards channel 816.

Figure 8:
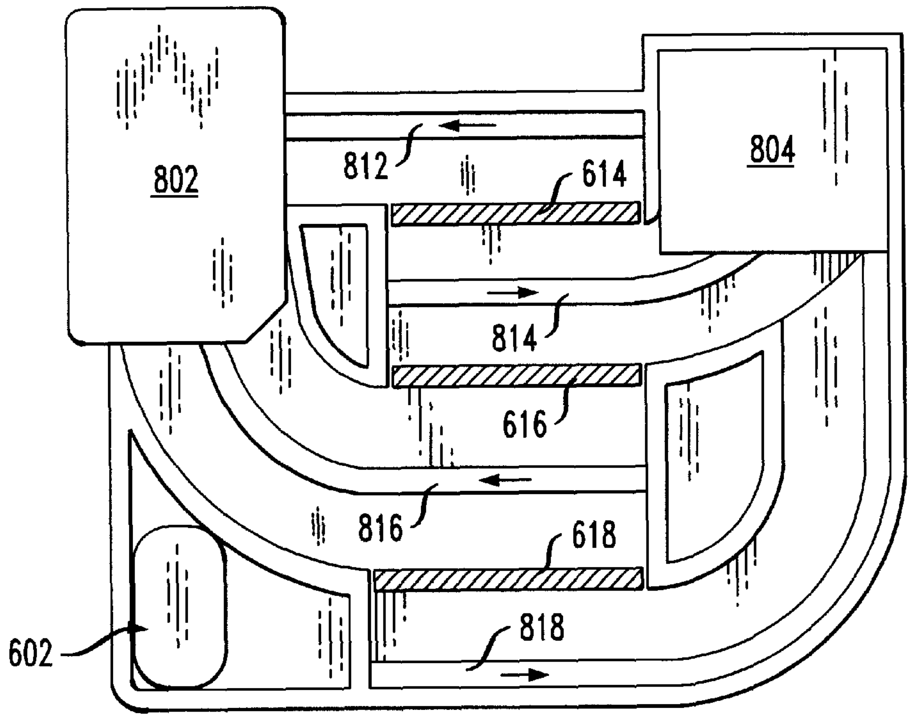
FIG. 8 depicts a top cross-sectional view similar to FIG. 6 that provides additional illustration of the coin-collect and coin-return channels.

The ultimate disposition of a coin, once directed to a specific channel, is now described with reference to FIG. 8. Coin-collect channels 818 and 814 route a received coin towards coin-collection reservoir 804. Coin-return channels 816 and 812 route a received coin towards coin return 802. Returning to the previous example, when steering vane 618 is in its home position (i.e., solenoid 618*a* is unenergized), coin 708 is directed to coin-collect channel 818 for routing to the coin-collection reservoir. When steering vane 618 is in its energized position, coin 708 is directed to coin-return channel 816 for routing to the return port.

Steering vanes 614 and 616 operate in a manner analogous to that of steering vane 618, independently directing respective coins 704 and 706, once shuttled, into coin-collect channel 814, or into respective coin-return channels 812 and 816. In FIG. 7, steering vanes 614 and 616 are shown in an energized state, so that respective coins 704 and 706, when shuttled, are directed to coin-return channels 812 and 816.

After any coins disposed on a ledge are shuttled, shuttle 502, under the control of the processor, moves to shuttle coins off the other ledge if coins are present there. If the other ledge is empty, the shuttle returns to the home position. A variety of arrangements for keeping the processor apprised of the shuttle's location can be designed by those skilled in the art. In one embodiment, a position-detector switch is used. In an illustrative embodiment of such a position-detector switch, a stationary member and a movable member mechanically linked to the shuttle contact one another when the shuttle is in the home position. When such contact is present, a signal is sent to the processor. That signal apprises the processor that the shuttle is in the home position. D.C. current is applied to shuttle motor 602 to move the shuttle. Current polarity dictates the motor's direction of rotation and the shuttle's direction of movement (i.e., left or right of home). As current is applied to shuttle motor 602 for the first time, the shuttle moves to the left or the right as a function of current polarity under the control of the processor. The processor counts "clicks" from the position-detector switch to keep track of the position of shuttle 502.

It will be appreciated that the home position of the coin-steering vanes is a matter of design choice. Moreover, the home position of each steering vane can be selected independently of the home position of any other steering vane. It is expected, however, that an entity owning a public phone in accordance with the illustrated embodiments of the present invention will typically design the steering vanes such that "homed" steering vanes will direct a coin to a coin-collect channel.

Steering vanes 614–618 advantageously include coin shutters 714–718 for guiding a shuttled coin into the appropriate coin channel.

The present invention advantageously provides a coin changer that is fast, routing up to three coins at a time through collect/return manifold 600. It should be understood, however, that due in part to such simultaneous routing, "perfect" (i.e., correct) change cannot routinely be provided. As an example, consider a situation in which a credit of forty cents is due to a telephone user. Assume that one dime, no nickels and two quarters are escrowed such that the dime and one of the quarters are perched on a ledge for shuttling into the collect/return manifold. The dime and the quarter, totaling 35 cents, are shuttled and routed to coin-return channels and ultimately to the return port. The shuttle returns to the home position, and the second quarter drops into position on the ledge. The processor must determine the disposition of the remaining quarter. Under a likely programming scenario, the processor will decide that the quarter should be sent to the coin-collection reservoir, rather than the caller, thereby leaving the user five cents short.

Figure 9:
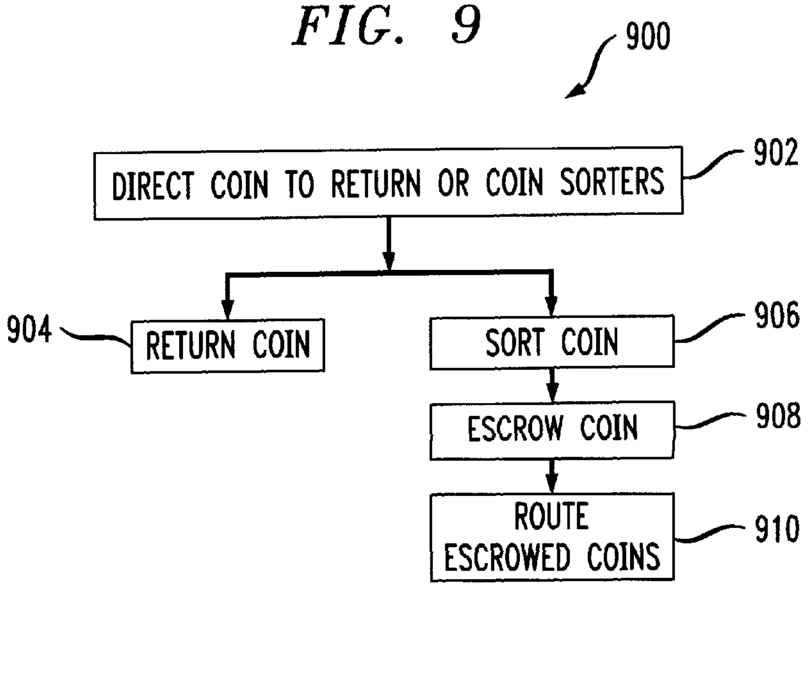
FIG. 9 depicts a flow diagram of an illustrative embodiment of a method for coin sorting in accordance with the present invention.
Figure 10:
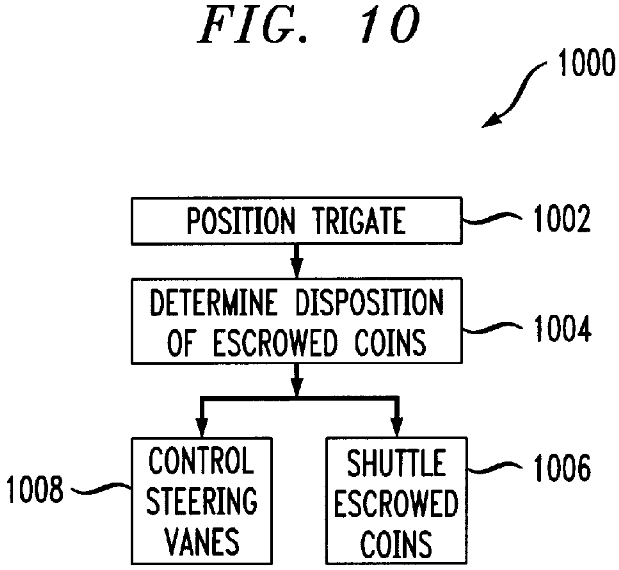
FIG. 10 depicts a flow diagram of processor operations.
Figure 11:
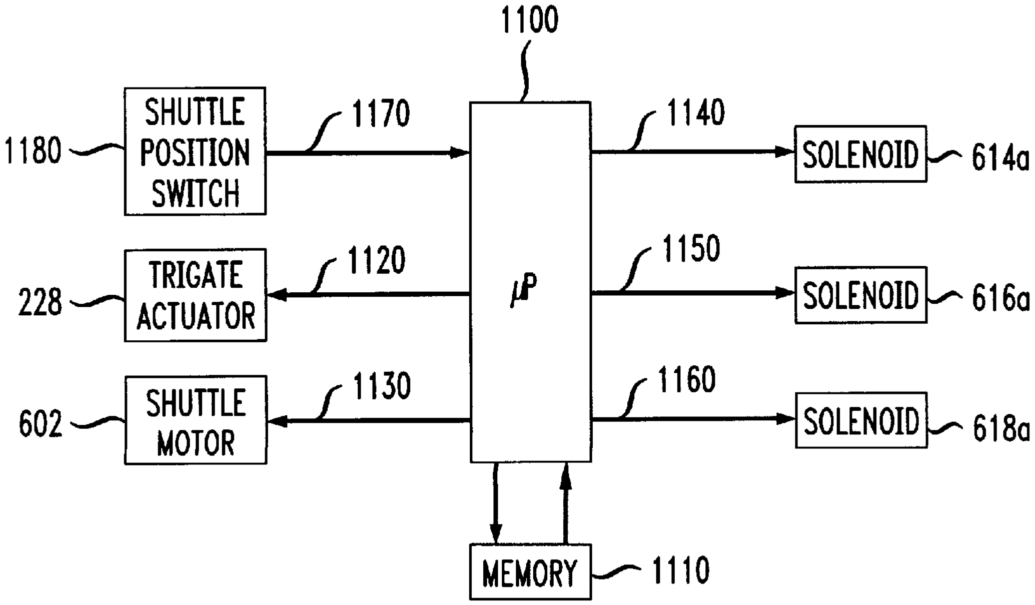
FIG. 11 depicts a simplified block diagram of communications between the processor and various actuating devices and sensors.

An inventive method, and activities of the processor as they relate to the present invention, have been described above. For clarity and conciseness, a flow chart 900 depicting steps in accordance with an illustrative embodiment of the inventive method is provided in FIG. 9, and processor activities in accomplishing such steps are summarized in FIG. 10 by way of flow chart 1000. FIG. 11 depicts a simplified block diagram of communications between the processor and various actuating devices and sensors. Possible paths of a coin through illustrative coin changer 300, responsive to the processor's actions and pursuant to the inventive method, are illustrated in FIG. 3*a*.

Processor 1100 determines the acceptability of a coin, and if acceptable, the denomination of that coin. In step 902 of the inventive method, a coin is directed to a return path if found to be unacceptable, or towards coin sorters 304*a* or 304*b* if found to be acceptable. As indicated in block 1002 of FIG. 10, processor 1100 accomplishes step 902 by appropriately positioning trigate 226. More specifically, processor 1100 sends a signal over line 1120 to trigate actuator 228 (FIG. 11). In response to that signal, trigate 226 is positioned, as appropriate, to direct the coin to the return chute (path 302*a*), or to one of the two coin sorters 304*a*, 304*b* (paths 302*b*, 302*c*). Thus, in step 904, an unacceptable coin is returned, and in step 906, an acceptable coin is sorted by the selected sorter. In the illustrative embodiments, the sorted coin is advantageously escrowed in step 908 in one of several denomination-specific escrow tubes.

As indicated in block 1004 of processor operational flow diagram 1000, the disposition of each sorted, and advantageously escrowed, coin is determined. Such a determination is made by the processor at an appropriate time after all coins that are required to satisfy the connect charge are inserted and escrowed. For example, if a connection cannot be established, the coins are directed to return port 802. If the connection is maintained for the paid-up connect period, the coins are directed to coin-collection reservoir 804. If the connection is broken before the paid-up connect period expires, and a credit is due, the processor determines what coins will be directed to the return port to provide at least partial satisfaction of the credit. In some embodiments, processor 1100 keeps track of the position and denomination of escrowed coins using memory 1110. Thus, memory 1110 is accessed for determining how best to provide change to a user (FIG. 11).

Finally, in step 910 of this illustrative embodiment of the present method, up to three coins are simultaneously, but independently, routed according to the dispositions determined in step 1004 of processor operational flow diagram.

The processor carries out step 910 by causing the shuttle to move, thereby shuttling any coins perched on one of the ledges (block 1006), while also directing the steering vanes so that the shuttled coins are appropriately routed (block 1008). More specifically, knowing the position of shuttle 502 as provided over line 1170 by shuttle position switch 1180, processor 1100 sends a signal over line 1130 to shuttle motor 602. The shuttle motor turns to the left or right as appropriate to move shuttle 502 in the desired direction. Drive direction of the shuttle motor can be controlled as a function of the polarity of a D.C. drive signal. Meanwhile, processor 1100 sends signals to solenoids 614*a*–618*a* over respective lines 1140–1160, independently energizing such solenoids, as appropriate, for routing a shuttled coin into coin-collect channels for coin-collection reservoir 804, or to coin-return channels for return port 804.

As described above, in some embodiments, the present coin changer is used to retrofit a BellCore standard public telephone, and in other embodiments a new BellCore standard public phone incorporates the present coin changer. In any of such embodiments, the various elements of the present coin changer must be appropriately sized to fit within the space available in such a phone. BellCore's specifications for such telephones are available to entities that fabricate telephones, and those skilled in the art will be able to design a coin changer in accordance with the present teachings and having a size suitable for incorporation within a BellCore standard public telephone.

It is to be understood that the embodiments described herein are merely illustrative of the many possible specific arrangements that can be devised in application of the principles of the invention. Other arrangements can be devised in accordance with these principles by those of ordinary skill in the art without departing from the scope and spirit of the invention. For example, while the illustrative embodiments described herein are directed to a public telephone configured to BellCore standards, the coin changer may be utilized in other applications, as well. Such applications include placement in larger public phones and vending machines, for example. Moreover, if the present coin changer is used in applications in which more space is available, the number of diameter-sorting holes and coin-escrow tubes in a given coin sorter/escrow hopper can perhaps be increased. It is therefore intended that such other arrangements be included within the scope of the following claims and their equivalents.

I claim:

1. A public telephone wherein a fee for a connection for a specified period of time is payable with an amount of coins from a first coin set having a plurality of different denominations of coins, comprising:

a coin mechanism having a coin-discrimination portion for determining coin acceptability of coins of different denominations from the first coin set, and a coin-changer portion that receives acceptable coins from the coin-discrimination portion and is operable to return a portion of the amount of coins if the connection is not maintained for the specified period, the coin changer comprising:

a first mechanical coin sorter that separates coins from the first coin set having different denominations;

a first coin-escrow hopper that temporarily stores the separated coins; and a collect/return manifold that receives the temporarily stored coins and individually routes each coin to one of either a coin-collection reservoir or a coin return according to a determined disposition.

2. The public telephone of claim 1, further comprising a mechanism for routing a discriminated coin to one of three locations.

3. The public telephone of claim 1, further comprising a shuttle for delivering coins to the collect/return manifold.

4. The public telephone of claim 1, wherein the collect/return manifold comprises a plurality of steering vanes and a plurality of coin-receiving channels, the plurality of coin-receiving channels comprising at least one coin-collect channel that delivers a coin to the coin-collection reservoir, and at least one coin-return channel that delivers a coin to the coin-return, wherein, each coin received by the collect/return manifold is routed, by one of the steering vanes, to one of either the coin-collect channel or the coin-return channel.

5. The public telephone of claim 1, wherein the first mechanical coin sorter separates coins as a function of coin diameter.

6. The pubic telephone of claim 5, wherein the first mechanical coin sorter comprises a plurality of holes having different sizes and arranged so that each of the different-sized holes admits a different-sized coin of the first coin set.

7. The public telephone of claim 6, wherein the first coin-escrow hopper comprises a plurality of receivers, wherein each receiver is operable to receive coins admitted by a different one of the holes.

8. The public telephone of claim 1, wherein the first mechanical coin sorter is operable to sort up to three different denominations of coins from the first coin set.

9. A public telephone operable to receive coins from a first coin set as a fee for a connection, comprising:

a coin-changer portion that receives coins from the first coin set and is operable to return to a user a portion of the received coins, the coin changer comprising:

a trigate movable to a first, a second and a third position, wherein, in the first position, the trigate delivers a received coin to a return chute;

a first mechanical coin sorter that receives a coin of a first denomination from the first coin set when the trigate is in the second position, wherein the first mechanical coin sorter separates received coins having different denominations;

a second mechanical coin sorter that receives a coin of a second denomination from the first coin set when the trigate is in the third position;

a first coin-escrow hopper that temporarily stores the separated coins;

a collect/return manifold that receives the temporarily stored coins and individually routes each coin to one of either a coin-collection reservoir or a coin return under the control of a processor; and, a shuttle that delivers the temporarily stored coins to the collect/return manifold.

10. A coin mechanism comprising:

a coin-discrimination portion for determining acceptability of received coins and denomination of acceptable coins, wherein acceptable coins belong to a first coin set;

a coin-changer portion that receives acceptable coins from the coin-discrimination portion and is operable to return a portion of received acceptable coins, the coin changer comprising:

a first mechanical coin sorter that separates received coins belonging to the first coin set having different denominations;

a first coin-escrow hopper that temporarily stores the separated coins;

a collect/return manifold that receives the temporarily stored coins and individually routes each coin to one of either a coin-collection reservoir or a coin return according to a determined disposition; and a processor to determine the disposition of each coin.

11. A coin changer suitable for use in a public telephone, the coin changer comprising:

a trigate positionable in a first, second and third position;

a first mechanical coin sorter that receives a coin of a first denomination belonging to a first coin set when the trigate is in the second position, the sorter operable to segregate coins delivered thereto by denomination;

a second mechanical coin sorter that receives a coin of a second denomination belonging to the first coin set when the trigate is in the third position;

a first escrow hopper comprising one receiver for each coin denomination segregated by the first mechanical coin sorter, wherein each receiver provides temporary storage for denominationally-segregated coins;

a collect/return manifold that is operable, under the action of a processor, to individually route each coin delivered thereto to one of either a coin-collection reservoir or a coin return, and a shuttle physically adapted to receive coins from each receiver and to deliver such coins to the collect/return manifold.

12. A method for providing change in a public telephone, comprising the steps of:

delivering acceptable coins from a first coin set having a plurality of different denominations to a mechanical sorter;

sorting the coins by denomination with a first mechanical sorter;

storing, the denominationally-sorted coins in receivers, one denomination in each receiver;

determining a disposition for each denominationally-sorted coin, the disposition being one of either routing the coin to a coin return or routing the coin to a coin-collection reservoir; and routing each coin, individually, in accordance with the determined disposition.

13. The method of claim 12, wherein the step of delivering further comprises providing a mechanism for delivering coins to three different locations, the mechanical sorter being at one of the locations.

14. The method of claim 12, wherein the step of sorting further comprises separating the coins based on differences in their diameters.

15. The method of claim 12, wherein the step of routing further comprises:

delivering coins from the receivers to a plurality of steering vanes, each steering vane operable to route a coin to a coin-collect channel leading to the coin-collection reservoir, and a coin-return channel leading to the coin return, one coin at a time to one channel at a time; and individually routing the coins in accordance with the determined disposition using the steering vanes.

16. A public telephone wherein a fee for a connection for a specified period of time is payable with an amount of coins from a first coin set having a plurality of different denominations of coins, comprising:

a coin mechanism having a coin-discrimination portion for determining coin acceptability, and a coin-changer portion that receives acceptable coins from the coin-discrimination portion and is operable to return a portion of the amount of coins if the connection is not maintained for the specified period, the coin changer comprising:

a first mechanical coin sorter that separates coins from the first coin set having different denominations;

a first coin-escrow hopper that temporarily stores the separated coins; and a collect/return manifold that receives the temporarily stored coins and individually routes each coin to one of either a coin-collection reservoir or a coin return according to a determined disposition;

the public telephone further comprising an appropriately-programmed general-purpose processor to determine the disposition of each coin.

17. A public telephone wherein a fee for a connection for a specified period of time is payable with an amount of coins from a first coin set, comprising:

a coin mechanism having a coin-discrimination portion for determining coin acceptability, and a coin-changer portion that receives acceptable coins from the coin-discrimination portion and is operable to return a portion of the amount of coins if the connection is not maintained for the specified period, the coin changer comprising:

a first mechanical coin sorter that separates coins from the first coin set having different denominations;

a first coin-escrow hopper that temporarily stores the separated coins;

a collect/return manifold that receives the temporarily stored coins and individually routes each coin to one of either a coin-collection reservoir or a coin return according to a determined disposition;

a mechanism for routing a discriminated coin to one of three locations; and a second mechanical coin sorter that separates coins from a second coin set having different denominations, and a second coin-escrow hopper that temporarily stores the separated coins from the second coin set.

18. The public telephone of claim 17, wherein the second coin-escrow hopper comprises a plurality of receivers, wherein each receiver is operable to receive coins admitted by a different one of a plurality of holes having different sizes and arranged so that each of the different-sized holes admits a different-sized coin of the second coin set.

19. The public telephone of claim 17, wherein the mechanism for routing a discriminated coin routes a coin to one of either (i) the coin return, (ii) the first mechanical coin sorter, or (iii) the second mechanical coin sorter.

20. The public telephone of claim 19, wherein the first and second mechanical coin sorters are operable to sort up to three different denominations of coins from the respective first and second coin sets, and wherein the first and second coin escrow hoppers each comprise three receivers, wherein each receiver in the first coin-escrow hopper is operable to receive a different one of the three denominations of coins sorted by the first mechanical coin sorter, and wherein each receiver in the second coin-escrow hopper is operable to receive a different one of the three denominations of coins sorted by the second mechanical coin sorter.

21. The public telephone of claim 20, further comprising a shuttle movable in a first and a second direction and having six holes arranged in a first and second set of three holes, the three holes within the first and second set aligned and appropriately sized to receive coins delivered from the three receivers in each of respective first and second coin-escrow hoppers.

22. The public telephone of claim 21, further comprising a first and a second ledge disposed underneath the shuttle, wherein, coins received by the first and second sets of holes in the shuttle are delivered to respective first and second ledges.

23. The public telephone of claim 22, further comprising a processor operable to determine if any of the amount of coins paid to the public phone as the fee for the connection should be returned to the coin return, wherein, having access to data indicative of the presence and denomination of any coins on the first and second ledges, as well as the number of coins of each denomination and the relative position of such coins within each receiver the processor is further operable to determine which coins should be directed to the coin-collection reservoir and which coins, if any, should be directed to the coin return.

24. The public telephone of claim 23, wherein, when moved in the first direction under control of the processor, the shuttle is operable to deliver coins disposed on the first ledge to the collect/return manifold, and when moved in the second direction under control of the processor, the shuttle is operable to deliver coins disposed on the second ledge to the collect/return manifold.

25. The public telephone of claim 24, wherein the collect/return manifold comprises three steering vanes, and at least two coin-collect channels that deliver a coin to the coin-collection reservoir, and at least two coin-return channels that deliver a coin to the coin-return, wherein, each steering vane is operable to deliver coins to one of the coin-collect channels and one of the coin-return channels, one coin at a time to one channel at a time, and further wherein, when coins are delivered, up to three at a time, to the collect/return manifold, each one of the steering vanes receives up to one of the coins.

26. The public telephone of claim 25, wherein, based on the determination of which coins should be directed to the coin-collection reservoir and which coins, if any, should be directed to the coin return, the processor is operable to direct each steering vane, as appropriate, to deliver the received coin to one of either the one coin-collect channel or the one coin-return channel.

27. A public telephone operable to receive coins from a first coin set as a fee for a connection, comprising:

a coin-changer portion that receives coins from the first coin set and is operable to return to a user a portion of the received coins, the coin changer comprising:

a trigate movable to a first, second and a third position, wherein, in the first position, the trigate delivers a received coin to a return chute;

a first mechanical coin sorter that receives a coin from the first coin set when the trigate is in the second position, wherein the first mechanical coin sorter separates received coins having different denominations;

a first coin-escrow hopper that temporarily stores the separated coins;

a collect/return manifold that receives the temporarily stored coins and individually routes each coin to one of either a coin-collection reservoir or a coin return under the control of a processor;

a shuttle that delivers the temporarily stored coins to the collect/return manifold; and a second mechanical coin sorter that receives a coin from a second coin set when the trigate is in the third position, wherein the second mechanical sorter separates received coins having different denominations.

28. The public telephone of claim 27, wherein each mechanical sorter is operable to sort three denominations of coins.

29. The public telephone of claim 27, wherein about one active actuation device is used to operate the coin changer per sortable denomination.

30. A coin mechanism comprising:

a coin-discrimination portion for determining acceptability of received coins and denomination of acceptable coins, wherein acceptable coins belong to a first coin set;

a coin-changer portion that receives acceptable coins from the coin-discrimination portion, is operable to return a portion of received acceptable coins, and is operable to determine the denomination of coins belonging to a second coin set, wherein, received coins belonging to the second set are considered to be acceptable by the coin-discrimination portion, the coin changer comprising:

a first mechanical coin sorter that separates received coins belonging to the first coin set having different denominations;

a first coin-escrow hopper that temporarily stores the separated coins;

a collect/return manifold that receives the temporarily stored coins and individually routes each coin to one of either a coin-collection reservoir or a coin return according to a determined disposition;

a second mechanical coin sorter that separates received coins belonging to the second coin set having different denominations; and at least one device that is operable to direct a non-acceptable coin to the coin return to direct a coin belonging to the first coin set to the first mechanical coin sorter, and to direct a coin belonging to the second coin set to the second mechanical sorter.

31. The coin mechanism of claim 30, wherein the first and second mechanical coin sorters are physically adapted to be removed from the coin-changer portion and be replaced by third and fourth mechanical coin sorters, wherein the third mechanical sorter is operable to sort coins from a third coin set having different denominations, and the fourth mechanical sorter is operable to sort coins from a fourth coin set having different denominations.

32. The coin mechanism of claim 30, wherein the first and second mechanical sorters separate coins on the basis of their diameter using appropriately-sized holes.

33. The coin mechanism of claim 32, wherein the first mechanical sorter is operable to sort three denominations of coins.

34. A coin changer suitable for use in a public telephone, the coin changer comprising:

a trigate positionable in a first, second and third position;

a first mechanical coin sorter that receives a coin belonging to a first coin set when the trigate is in the second position, the sorter operable to segregate coins delivered thereto by denomination;

a first escrow hopper comprising one receiver for each coin denomination segregated by the first mechanical coin sorter, wherein each receiver provides temporary storage for denominationally-segregated coins;

a collect/return manifold that is operable, under the action of a processor, to individually route each coin delivered thereto to one of either a coin-collection reservoir or a coin return, and a shuttle physically adapted to receive coins from each receiver and to deliver such coins to the collect/return manifold;

a second mechanical coin sorter that receives a coin from a second coin set when the trigate is in the third position, the sorter operable to segregate coins delivered thereto by denomination; and a second escrow hopper comprising one receiver for each coin denomination segregated by the second mechanical coin sorter, wherein each receiver provides temporary storage for denominationally-segregated coins.

35. The coin changer of claim 34, wherein the first and second mechanical coin sorters are operable to sort three denominations of coins from the respective first and second coin sets.

36. The coin changer of claim 35, wherein at least five active devices are used for coin sorting.

37. A method for providing change in a public telephone, comprising the steps of:

delivering coins to a mechanical sorter;

sorting the coins by denomination, wherein, the step of sorting further comprises:

sorting up to three different denominations of coins in the mechanical sorter; and the step of delivering further comprises delivered up to three coins at a time to three steering vanes, one coin to each steering vane;

storing, the denominationally-sorted coins in receivers, one denomination in each receiver;

determining a disposition for each denominationally-sorted coin, the disposition being one of either routing the coin to a coin return or routing the coin to a coin-collection reservoir;

and routing each coin, individually, in accordance with the determined disposition, wherein the step of routing further comprises:

delivering coins from the receivers to a plurality of steering vanes, each steering vane operable to route a coin to a coin-collect channel leading to the coin-collection reservoir, and a coin-return channel leading to the coin return, one coin at a time to one channel at a time; and individually routing the coins in accordance with the determined disposition using the steering vanes.

* * * * *